United States Patent
Yang

(10) Patent No.: US 10,884,662 B2
(45) Date of Patent: Jan. 5, 2021

(54) METHOD FOR PERFORMING STORAGE CONTROL IN A STORAGE SERVER, ASSOCIATED MEMORY DEVICE AND MEMORY CONTROLLER THEREOF, AND ASSOCIATED STORAGE SERVER

(71) Applicant: Silicon Motion Inc., Hsinchu County (TW)

(72) Inventor: Tsung-Chieh Yang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/296,161

(22) Filed: Mar. 7, 2019

(65) Prior Publication Data

US 2020/0042244 A1 Feb. 6, 2020

Related U.S. Application Data

(60) Provisional application No. 62/715,229, filed on Aug. 6, 2018.

(51) Int. Cl.
*G06F 3/06* (2006.01)
*G06F 11/10* (2006.01)

(52) U.S. Cl.
CPC .......... *G06F 3/0659* (2013.01); *G06F 3/0604* (2013.01); *G06F 3/0644* (2013.01); *G06F 3/0689* (2013.01); *G06F 11/1076* (2013.01)

(58) Field of Classification Search
CPC .............................. G06F 3/0659; G06F 3/0604
See application file for complete search history.

(56) References Cited

U.S. PATENT DOCUMENTS

| | | | | |
|---|---|---|---|---|
| 6,886,074 B1* | 4/2005 | Narayanaswamy | .. | G06F 3/0613 709/201 |
| 2004/0073778 A1* | 4/2004 | Adiletta | ................ | G06F 9/3842 712/220 |
| 2006/0179281 A1* | 8/2006 | Jensen | .................. | G06F 9/3885 712/214 |
| 2007/0067705 A1* | 3/2007 | Kim | ..................... | G06F 11/1068 714/801 |
| 2010/0250826 A1* | 9/2010 | Jeddeloh | ............. | G06F 13/1684 711/103 |
| 2010/0262760 A1* | 10/2010 | Swing | ................... | G06F 3/0613 711/103 |

(Continued)

*Primary Examiner* — Edward J Dudek, Jr.
(74) *Attorney, Agent, or Firm* — Winston Hsu

(57) ABSTRACT

A method for performing storage control in a storage server may include: regarding any memory device of a plurality of memory devices installed at the storage server, assigning a channel of multiple channels within the memory device for access control corresponding to a thread of a plurality of threads running on the storage server, wherein the storage server configures the plurality of memory devices to form a RAID of the storage server; and during storing a series of logical access units (LAUs) into the RAID, writing information into respective sets of pages of the plurality of memory devices as pages in a LAU of the series of LAUs according to a predetermined arrangement rule, to make the respective sets of pages be sequentially written into the plurality of memory devices respectively with aid of the assignment of the channel of the multiple channels to the thread. Associated apparatus are provided.

20 Claims, 9 Drawing Sheets

(56) References Cited

U.S. PATENT DOCUMENTS

| | | | | |
|---|---|---|---|---|
| 2012/0059978 | A1* | 3/2012 | Rosenband | G06F 3/0613 |
| | | | | 711/103 |
| 2017/0147233 | A1* | 5/2017 | De | G06F 3/0685 |
| 2017/0322847 | A1* | 11/2017 | Park | G06F 11/1092 |
| 2020/0042223 | A1* | 2/2020 | Li | G06F 11/1068 |

* cited by examiner

METHOD FOR PERFORMING STORAGE CONTROL IN A STORAGE SERVER, ASSOCIATED MEMORY DEVICE AND MEMORY CONTROLLER THEREOF, AND ASSOCIATED STORAGE SERVER

CROSS REFERENCE TO RELATED APPLICATIONS

This application claims the benefit of U.S. provisional application No. 62/715,229, which was filed on Aug. 6, 2018, and is included herein by reference.

BACKGROUND OF THE INVENTION

1. Field of the Invention

The present invention is related to data storage, and more particularly, to a method and apparatus for performing storage control in a storage server, for example, a Redundant Array of Independent Disks (RAID) of the storage server may be implemented as an all flash array.

2. Description of the Prior Art

When a conventional RAID is implemented with Solid State Drives (SSDs), the write amplification index (WAI) is high, especially in all flash array storage server. For example, three data sets may be protected by two parity-code sets, and an operation of writing a data set may need three read operations and three write operations in the conventional RAID to guarantee that the conventional RAID can operate properly, where the WAI thereof is three. As the management of accessing the Flash memory in each of the SSDs is complicated, the WAI thereof may reach two. As a result, the overall WAI of the system may be the product of the two WAIs mentioned above, such as six (i.e. WAI=6). Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing storage control in a storage server, in order to solve the above-mentioned problems.

It is another objective of the present invention to provide a method and apparatus for performing storage control in a storage server, in order to achieve an optimal performance without introducing a side effect or in a way that less likely to introduce a side effect.

At least one embodiment of the present invention provides a method for performing storage control in a storage server, wherein the method is applied to the storage server. The method may comprise: regarding any memory device of a plurality of memory devices installed at the storage server, assigning a channel of multiple channels within the memory device for access control corresponding to a thread of a plurality of threads running on the storage server, wherein the storage server configures the plurality of memory devices to form a Redundant Array of Independent Disks (RAID) of the storage server; and during storing a series of logical access units (LAUs) into the RAID, writing information into respective sets of pages of the plurality of memory devices as pages in a LAU of the series of LAUs according to a predetermined arrangement rule, to make the respective sets of pages be sequentially written into the plurality of memory devices respectively with aid of the assignment of the channel of the multiple channels to the thread.

At least one embodiment of the present invention provides a memory controller of the memory device for controlling operations of the memory device according to the method mentioned above, wherein the memory device may comprise the memory controller and a non-volatile (NV) memory, and the NV memory may comprise a plurality of sets of NV memory elements respectively corresponding to the multiple channels. The memory controller is arranged to perform access operations on the plurality of sets of NV memory elements through the multiple channels, respectively. More particularly, the memory controller is arranged to assign the channel of the multiple channels as a dedicated channel for the thread.

At least one embodiment of the present invention provides the memory device that operates according to the method mentioned above. The memory device may comprise a NV memory which comprises a plurality of sets of NV memory elements respectively corresponding to the multiple channels, and may further comprise a memory controller that is arranged to control operations of the memory device, wherein the memory controller performs access operations on the plurality of sets of NV memory elements through the multiple channels, respectively.

At least one embodiment of the present invention provides the storage server that operates according to the method mentioned above. The storage server may comprise an interface circuit that is arranged to install the plurality of memory devices, and may further comprise a processing circuit that is arranged to control operations of the storage server. During storing the series of LAUs into the RAID, the processing circuit writes the information into the respective sets of pages of the plurality of memory devices as the pages in the LAU of the series of LAUs according to the predetermined arrangement rule, to make the respective sets of pages be sequentially written into the plurality of memory devices respectively with the aid of the assignment of the channel of the multiple channels to the thread.

The present invention method and associated apparatus can guarantee that the storage server can operate properly in various situations. For example, the method provides multiple control schemes for storage control, to enhance the performance of the storage server. In comparison with the related art, the storage server implemented according to the present invention can have better performance and much smaller WAI, where the overall WAI thereof may be two.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method and apparatus for performing storage control in a storage server, and the apparatus may comprise at least one portion (e.g. a portion or all) of the storage server. For example, the apparatus may comprise a portion of the storage server (e.g. a processing circuit running program modules corresponding to the method, an associated Redundant Array of Independent Disks (RAID) within the storage server, a memory device of the RAID, and/or a memory controller within the memory device). In another example, the apparatus may comprise the memory device. In another example, the apparatus may comprise the whole of the storage server.

Figure 1:
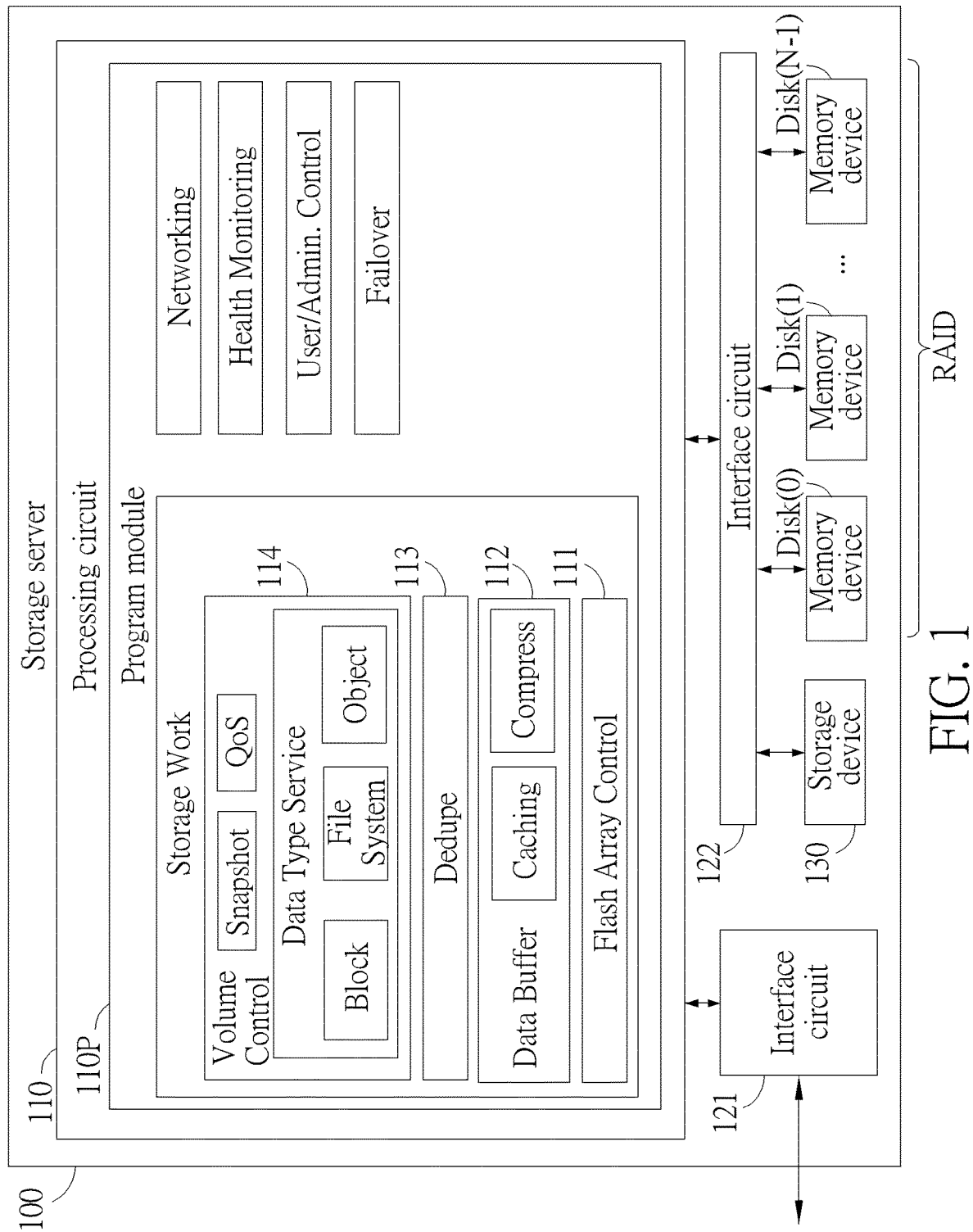
FIG. 1 is a diagram of a storage server according to an embodiment of the present invention.

FIG. 1 is a diagram of a storage server 100 according to an embodiment of the present invention. The storage server 100 may comprise a processing circuit 110 (e.g. at least one processor and associated circuits such as Random Access Memory (RAM), bus, etc.) for controlling operations of the storage server 100, an interface circuit 121 such as a network interface circuit for coupling the storage server 100 to at least one network, and another interface circuit 122 for coupling storage or memory devices (e.g. one or more Hard Disk Drive (HDDs) and/or one or more Solid State Drives (SSDs)) at the storage server 100. For example, the storage or memory devices may comprise a storage device 130 utilized as a system disk of the storage server 100, and a set of memory devices such as N memory devices Disk(0), Disk(1), . . . , and Disk(N−1). According to this embodiment, the processing circuit 110 running program modules 110P may be arranged to control operations of the storage server 100 according to the method, the interface circuit 121 such as the network interface circuit may be arranged to provide wired or wireless network connections, and the interface circuit 122 may conform to a specific specification (e.g. any of Serial Advanced Technology Attachment (Serial ATA, or SATA) specification, Peripheral Component Interconnect (PCI) specification, Peripheral Component Interconnect Express (PCIe) specification, etc.), and may perform communications according to the specific specification. In addition, the processing circuit 110 running the program modules 110P may access the storage device 130 and the memory devices Disk(0), Disk(1), . . . , and Disk(N−1) through the interface circuit 122, and may configure the memory devices Disk(0), Disk(1), . . . , and Disk(N−1) to form a RAID of the storage server 100. For better comprehension, the storage server 100 and the associated circuits/modules/devices in the architecture shown in FIG. 1 (e.g. the processing circuit 110 running the program modules 110P, the RAID, and any of the memory devices Disk(0), Disk(1), . . . , and Disk(N−1)) may be taken as examples of the aforementioned storage server and the associated circuits/modules/devices thereof (e.g. the processing circuit running program modules corresponding to the method, the associated RAID within the storage server, and the memory device), respectively.

As shown in FIG. 1, the program modules 110P may comprise various types of modules/sub-modules, such as Storage Work and its sub-modules, Networking, Health Monitoring, User/Administration (Admin.) Control, and Failover, and the Storage Work may comprise Volume Control 114 (which may comprise Snapshot, Quality of Service (QoS), and Data Type Services including Block, File System, and Object for providing services of the respective data types of block, file system, and object), Deduplication (Dedupe) 113, Data Buffer 112 (which may comprise Caching and Compress), and Flash Array Control 111, where the names of these modules/sub-modules may indicate the related functions thereof, respectively.

Figure 2:
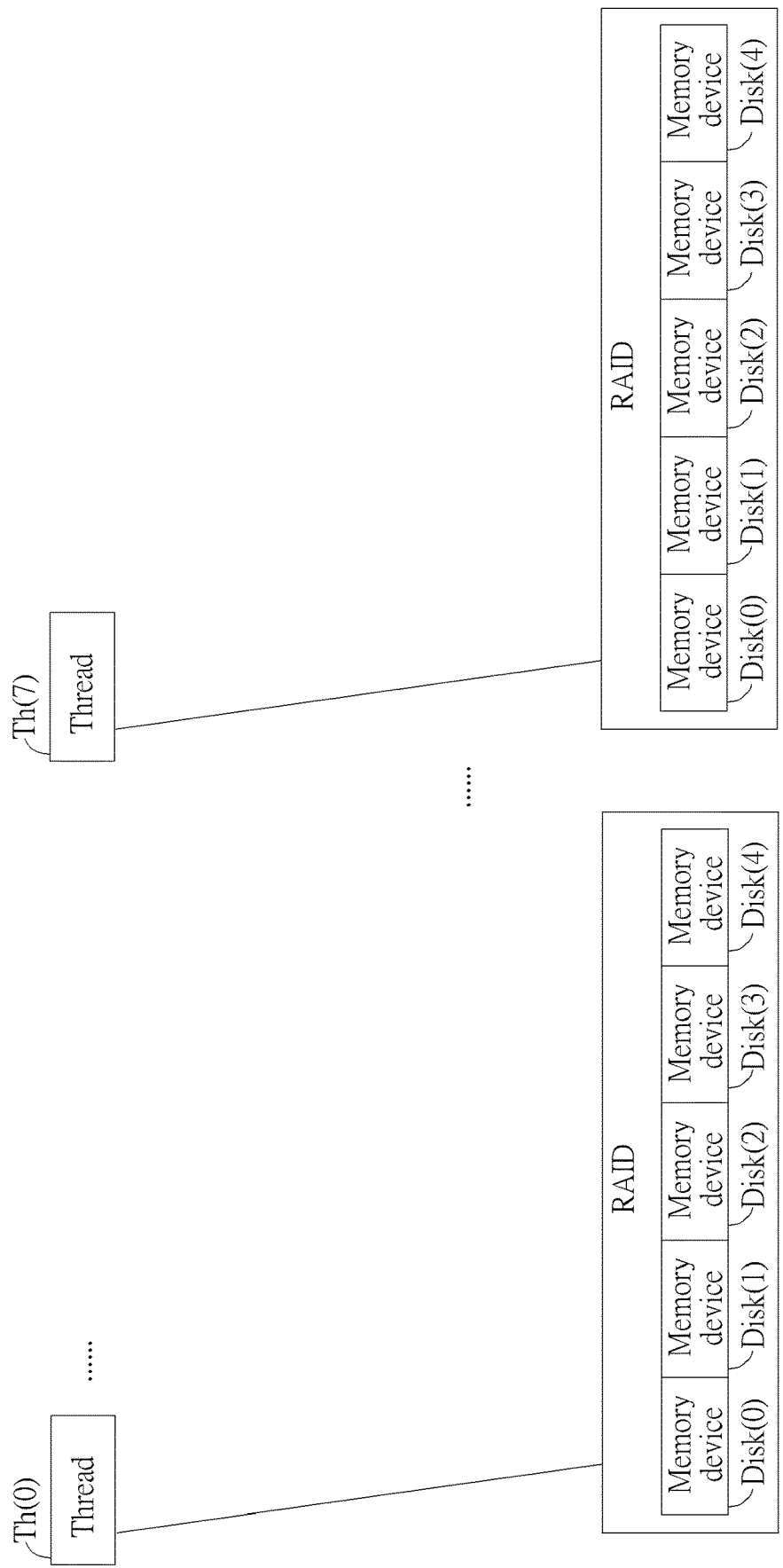
FIG. 2 illustrates an example of RAID access corresponding to multiple threads.

FIG. 2 illustrates an example of RAID access corresponding to multiple threads running on the storage server 100. A thread can be deemed as the smallest sequence of programmed instructions that can be managed independently by a scheduler. For better comprehension, assume that N=5, and the memory devices Disk(0), Disk(1), . . . , and Disk(N−1) may comprise the memory devices Disk(0), Disk(1), . . . , and Disk(4), but the present invention is not limited thereto. When multiple threads such as the threads {Th(0), . . . , Th(7)} are running on the processing circuit 110 to access the RAID, each of the threads {Th(0), . . . , Th(7)} typically accesses all of the memory devices Disk(0), Disk (1), . . . , and Disk(4). As a result, each of the memory devices Disk(0), Disk(1), . . . , and Disk(4) may be accessed by all of the threads {Th(0), . . . , Th(7)}. The present invention method and apparatus can control access operations properly to achieve optimal performance in various situations, respectively. More details will be illustrated below.

Figure 3:
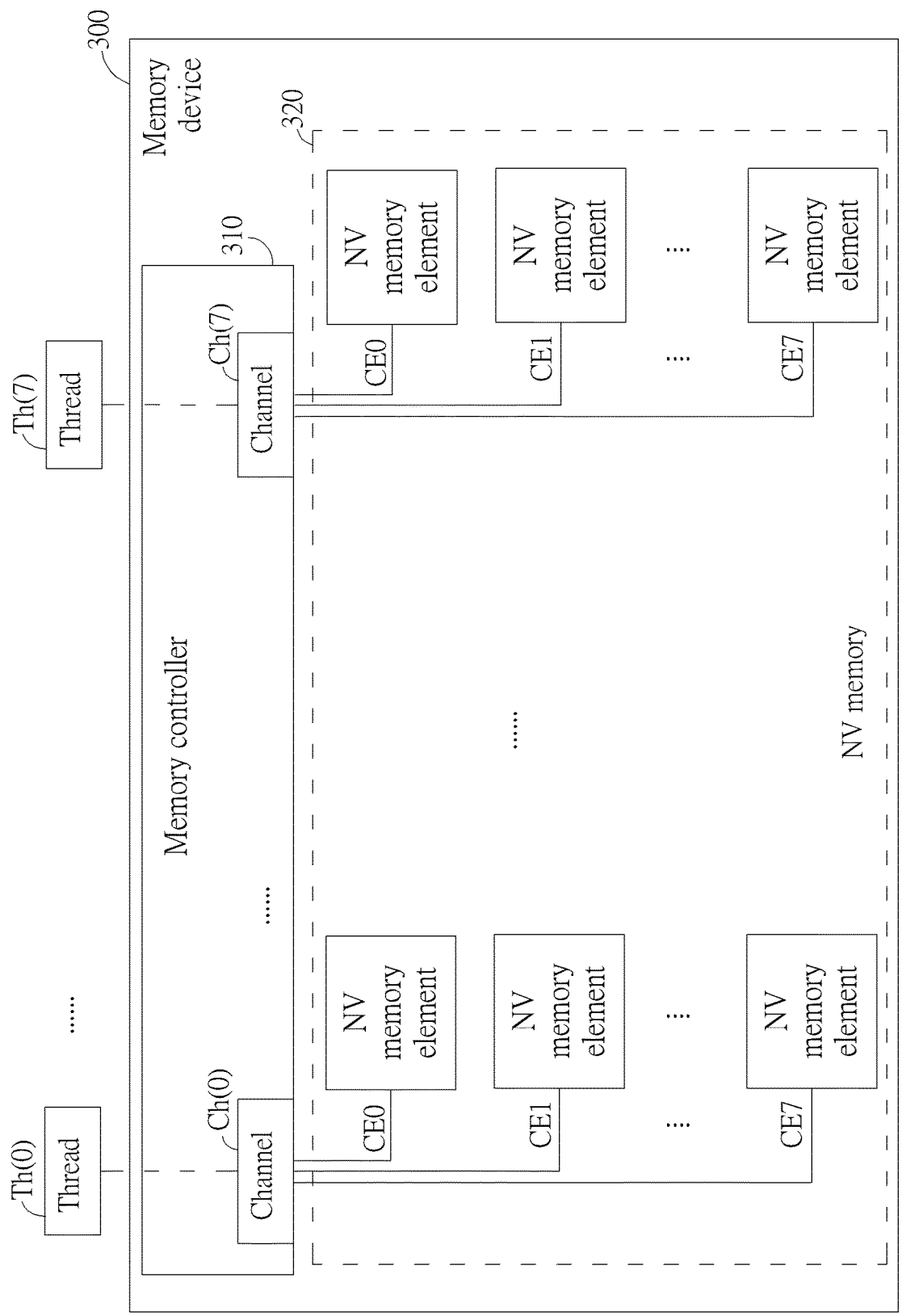
FIG. 3 illustrates an example of assigning one of multiple channels within the memory device for access control corresponding to one thread.

FIG. 3 illustrates an example of assigning one of multiple channels such as the channels {Ch(0), . . . , Ch(M−1)} within the memory device 300 for access control corresponding to one thread. For better comprehension, assume that M=8, and the channels {Ch(0), . . . , Ch(M−1)} may comprise the channels {Ch(0), . . . , Ch(7)}, but the present invention is not limited thereto. The memory device 300 may be taken as an example of any memory device Disk(n) within the memory devices Disk(0), Disk(1), . . . , and Disk(N−1), where the notion "n" may represent an integer in the interval [0, N−1]. According to this embodiment, the memory device 300 may comprise a memory controller 310 for controlling operations of the memory device 300, and may further comprise a non-volatile (NV) memory 320 (e.g. a Flash memory) for storing data. For example, the NV memory 320 may comprise one or more NV memory elements (e.g. one or more Flash memory dies, or one or more Flash memory chips), such as a plurality of sets of NV memory elements respectively corresponding to the channels {Ch(0), . . . , Ch(M−1)} (e.g. M=8). The memory controller 310 may control the operations of the memory device 300 according to the method of the present invention, to perform access operations (e.g. reading or writing) on the plurality of sets of NV memory elements through the channels {Ch(0), . . . , Ch(M−1)}, respectively. More particularly, the memory controller 310 may assign any channel Ch(m) of the channels {Ch(0), . . . , Ch(M−1)} (e.g. the notion "m" may represent an integer in the interval [0, M−1]) as a dedicated channel for a thread such as the thread Th(m). For example, in a situation where m=0, the memory controller 310 may assign the channel Ch(0) to the thread Th(0), and may also assign the associated set of NV memory elements (e.g. the set of NV memory elements corresponding to the channel Ch(0), such as that controlled through the Chip Enable (CE) signals {CE0, CE1, . . . , CE7} of the channel Ch(0)) to the thread Th(0). The value of m may vary, and the rest may be deduced by analogy. Similarly, in a situation where m=7, the memory controller 310 may assign the channel Ch(7) to the thread Th(7), and may also assign the associated set of NV memory elements (e.g. the set of NV memory elements corresponding to the channel Ch(7), such as that controlled through the Chip Enable (CE) signals {CE0, CE1, . . . , CE7} of the channel Ch(7)) to the thread Th(7). Please note that one channel can be assigned for two or more threads, as long as the channel is assigned for the dedicate thread(s). Similarly, one or more channels can be assigned for one thread. In addition, the mapping between threads and channel can be dynamically set under requirements.

Figure 4:
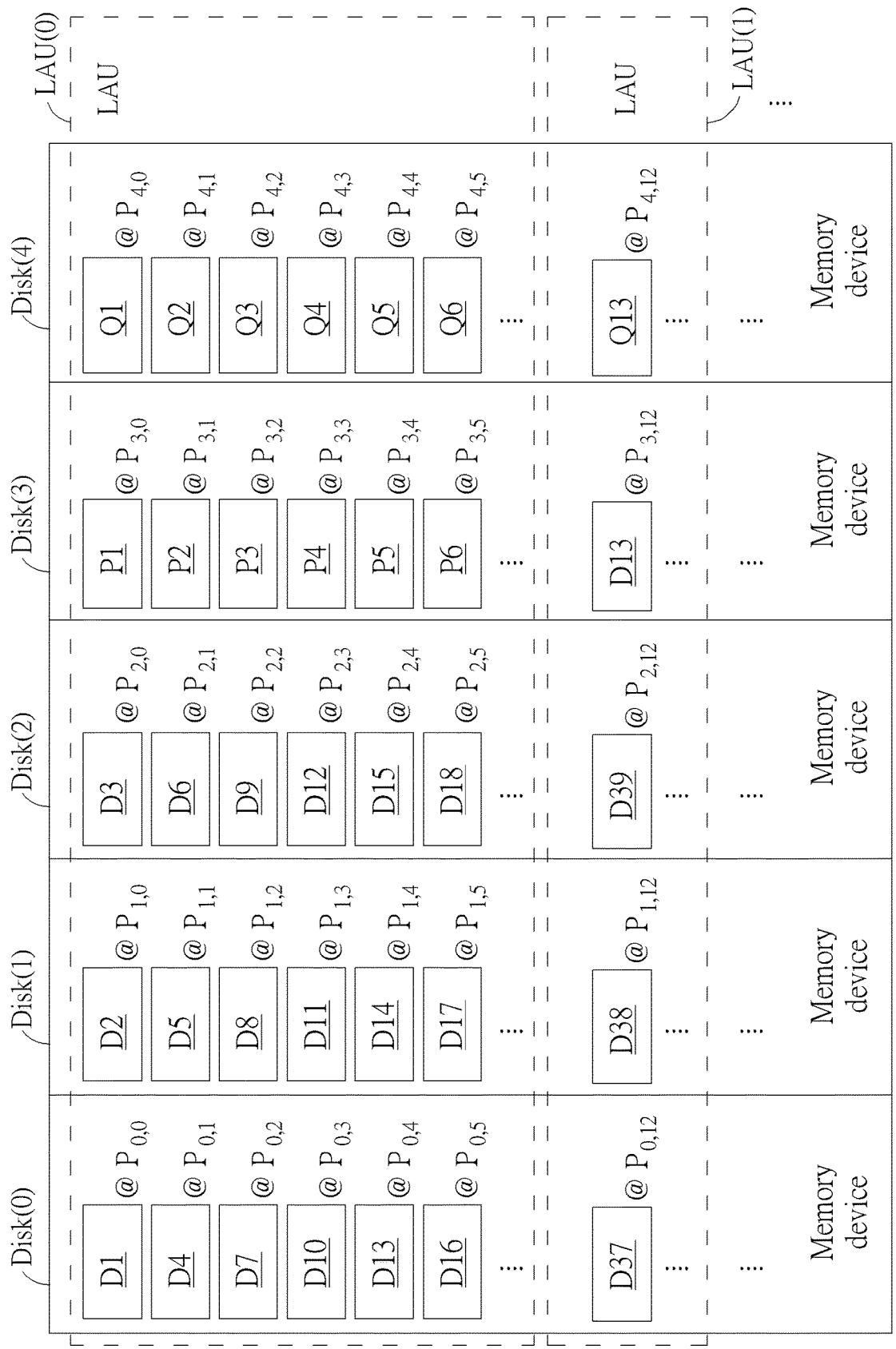
FIG. 4 illustrates some logical access units (LAUs) in the RAID of the storage server according to an embodiment of the present invention.

FIG. 4 illustrates some logical access units (LAUs) in the RAID of the storage server 100 according to an embodiment of the present invention. For better comprehension, assume that N=5 (e.g. there are the memory devices Disk(0), Disk(1), Disk(2), Disk(3), and Disk(4) in the RAID), and the size of a LAU and the associated sizes of blocks, pages, etc. in the memory device 300 may be equal to some predetermined values, respectively (e.g. the LAU may comprise (12*N) pages with 12 pages per disk in the LAU, a Single Level Cell (SLC) block may comprise 3 pages, and a Quadruple Level Cell (QLC) block may comprise 12 pages), but the present invention is not limited thereto.

According to this embodiment, the processing circuit 110 (e.g. the Flash Array Control 111 running thereon) may control the RAID to store multiple pages of data (e.g. D1, D2, D3, D4, D5, D6, etc.) subsequently and associated pages of parity-codes (e.g. P1, Q1, P2, Q2, etc.), and to protect three pages of data sets (e.g. D1, D2, and D3) in the memory devices Disk(0), Disk(1), and Disk(2) with two pages of parity-codes (e.g. P1 and Q1) in the memory devices Disk(3) and Disk(4). For example, the processing circuit 110 (e.g. the Flash Array Control 111 running thereon) may write three pages of data sets in a specific row within the rows of pages shown in FIG. 4 (e.g. D1, D2, and D3 of the first row of pages) into the RAID and generate two pages of parity-codes (e.g. P1 and Q1) according to the three pages of data sets in the specific row by utilizing respective Error Correction Code (ECC) encoding methods, and write the two pages of parity-codes corresponding to the specific row (e.g. P1 and Q1) into the RAID. More particularly, the processing circuit 110 (e.g. the Flash Array Control 111 running thereon) may perform similar operations on other rows (e.g. the next row and the subsequent rows, such as that within the rows of pages shown in FIG. 4) to sequentially write the other rows into the RAID, and therefore may store a series of LAUs {LAU(0), LAU(1), . . . } into the RAID, but the present invention is not limited thereto.

In addition, when writing the pages in the series of LAUs into the RAID, the processing circuit 110 (e.g. the Flash Array Control 111 running thereon) may record relationships between System Logic Block Addresses (S_LBAs) and Disk Pseudo Physical Page Addresses (D_P_PPAs) for the pages, respectively. For example, at least one upper layer of the Flash Array Control 111 (e.g. one or more upper layers, such as the Data Buffer 112, the Dedupe 113, and/or the Volume Control 114) may send the S_LBAs to the Flash Array Control 111 to ask for accessing information at the S_LBAs, respectively, and the Flash Array Control 111 may assign the D_P_PPAs (e.g. $\{P_{0,0}, P_{1,0}, P_{2,0}, P_{3,0}, P_{4,0}\}$, $\{P_{0,1}, P_{1,1}, P_{2,1}, P_{3,1}, P_{4,1}\}$, etc.) to corresponding memory devices for accessing the pages at the D_P_PPAs within the RAID, where the Flash Array Control 111 may perform these operations in a Redirect-On-Write (ROW) manner, but the present invention is not limited thereto. Please refer to FIG. 4. For better comprehension, the D_P_PPAs $\{P_{0,0}, P_{1,0}, P_{2,0}, P_{3,0}, P_{4,0}\}$, $\{P_{0,1}, P_{1,1}, P_{2,1}, P_{3,1}, P_{4,1}\}$, etc. are illustrated next to the rows of data and parity pages {D1, D2, D3, P1, Q1}, {D4, D5, D6, P2, Q2}, etc. with the notation "@" in FIG. 4, respectively, to indicate that these pages are stored at the $\{P_{0,0}, P_{1,0}, P_{2,0}, P_{3,0}, P_{4,0}\}$, $\{P_{0,1}, P_{1,1}, P_{2,1}, P_{3,1}, P_{4,1}\}$, etc., respectively. For example, the processing circuit 110 (e.g. the Flash Array Control 111 running thereon) may record the relationships between the S_LBAs of the pages {{D1, D2, D3, P1, Q1}, {D4, D5, D6, P2, Q2}, . . . } and the D_P_PPAs {{$P_{0,0}, P_{1,0}, P_{2,0}, P_{3,0}, P_{4,0}$}, {$P_{0,1}, P_{1,1}, P_{2,1}, P_{3,1}, P_{4,1}$}, . . . } in at least one S_LBA-to-D_P_PPA table (e.g. one or more S_LBA-to-D_P_PPA tables).

According to some embodiments, the aforementioned at least one S_LBA-to-D_P_PPA table may comprise a single S_LBA-to-D_P_PPA table, where the single S_LBA-to-D_P_PPA table may be arranged to store all of the relationships between the S_LBAs of the pages {{D1, D2, D3, P1, Q1}, {D4, D5, D6, P2, Q2}, . . . } and the D_P_PPAs {{$P_{0,0}, P_{1,0}, P_{2,0}, P_{3,0}, P_{4,0}$}, {$P_{0,1}, P_{1,1}, P_{2,1}, P_{3,1}, P_{4,1}$}, . . . }.

According to some embodiments, the aforementioned at least one S_LBA-to-D_P_PPA table may comprise a main S_LBA-to-D_P_PPA table comprising a set of S_LBA-to-D_P_PPA sub-tables respectively corresponding to the memory devices Disk(0), Disk(1), Disk(2), Disk(3), and Disk(4), where each S_LBA-to-D_P_PPA sub-table of the set of S_LBA-to-D_P_PPA sub-tables may be arranged to store a portion of the relationships between the S_LBAs of the pages {{D1, D2, D3, P1, Q1}, {D4, D5, D6, P2, Q2}, . . . } and the D_P_PPAs {{$P_{0,0}, P_{1,0}, P_{2,0}, P_{3,0}, P_{4,0}$}, {$P_{0,1}, P_{1,1}, P_{2,1}, P_{3,1}, P_{4,1}$}, . . . } such as that corresponding to one of the memory devices Disk(0), Disk(1), Disk(2), Disk(3), and Disk(4), but the present invention is not limited thereto.

Figure 5:
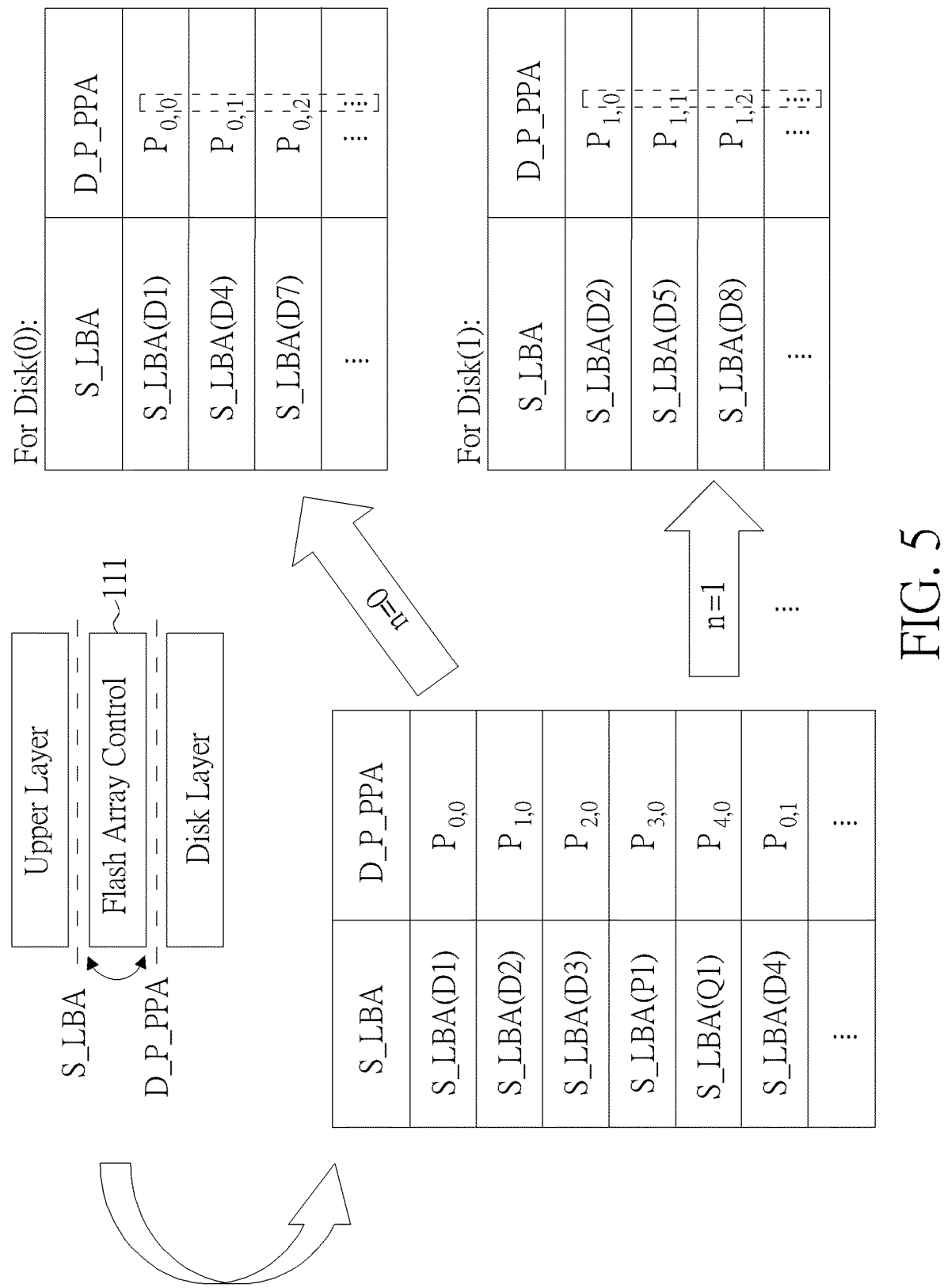
FIG. 5 illustrates some mapping relationships between different types of addresses related to the RAID of the storage server according to an embodiment of the present invention.

FIG. 5 illustrates some mapping relationships between different types of addresses related to the RAID of the storage server 100 according to an embodiment of the present invention. Regarding each channel (e.g. the channel Ch(m)), the processing circuit 110 running the Flash Array Control 111 may record the relationships between the S_LBAs {S_LBA(D1), S_LBA(D2), S_LBA(D3), S_LBA(P1), S_LBA(Q1), S_LBA(D4), . . . } of the pages {D1, D2, D3, P1, Q1, D4, . . . } and the D_P_PPAs$\{_{0,0}, P_{1,0}, P_{2,0}, P_{3,0}, P_{4,0}, P_{0,1}, . . . \}$, and may translate between the S_LBAs {S_LBA(D1), S_LBA(D2), S_LBA(D3), S_LBA(P1), S_LBA(Q1), S_LBA(D4), . . . } and the D_P_PPAs $\{P_{0,0}, P_{1,0}, P_{2,0}, P_{3,0}, P_{4,0}, P_{0,1}, . . . \}$ to access the disk layer (e.g. the memory devices Disk(0), Disk(1), Disk(2), Disk(3), and Disk(4)). For better comprehension, the S_LBA-to-D_P_PPA table shown around the lower left corner of FIG. 5 may be taken as an example of the single S_LBA-to-D_P_PPA table mentioned above, and the series of S_LBA-to-D_P_PPA tables shown in the right half of FIG. 5 and the combination thereof may be taken as examples of the set of S_LBA-to-D_P_PPA sub-tables and the main S_LBA-to-D_P_PPA table mentioned above, respectively, but the present invention is not limited thereto.

According to some embodiments, the processing circuit 110 running the Flash Array Control 111 may obtain the respective table contents of the series of S_LBA-to-D_P_PPA tables shown in the right half of FIG. 5 from the S_LBA-to-D_P_PPA table shown around the lower left corner of FIG. 5, to generate the S_LBA-to-D_P_PPA sub-table corresponding to the memory device Disk(n), such as the $0^{th}$ S_LBA-to-D_P_PPA table for the memory device Disk(0) (e.g. n=0), the $1^{st}$ S_LBA-to-D_P_PPA table for the memory device Disk(1) (e.g. n=1), etc. within the series of S_LBA-to-D_P_PPA tables. Please note that, in the $n^{th}$ S_LBA-to-D_P_PPA table for the memory device Disk(n), the Pseudo Physical Page Addresses (P_PPAs) within the D_P_PPAs $\{P_{n,\,0}\ P_{n,\,1},\ P_{n,\,2},\ \ldots\}$ can be sequentially arranged, and these P_PPAs may correspond to the secondary indexes $\{0, 1, 2, \ldots\}$ in the subscript of the notations of the D_P_PPAs $\{P_{n,\,0}\ P_{n,\,1},\ P_{n,\,2},\ \ldots\}$. As shown in the rectangles depicted with dashed lines in FIG. 5, the sequence of the secondary indexes $\{0, 1, 2, \ldots\}$ in the subscript of $\{P_{0,\,0}, P_{0,\,1}, P_{0,\,2}, \ldots\}$ (for n=0) and the sequence of the secondary indexes $\{0, 1, 2, \ldots\}$ in the subscript of $\{P_{1,\,0}, P_{1,\,1}, P_{1,\,2}, \ldots\}$ (for n=1) may indicate that the P_PPAs within the D_P_PPAs $\{P_{n,\,0}, P_{n,\,1}, P_{n,\,2}, \ldots\}$ (e.g. n=0, 1, etc.) can be sequentially arranged. Therefore, the processing circuit 110 running the Flash Array Control 111 can perform sequential access control on the memory device Disk(n) in the RAID when accessing the memory device Disk(n).

Figure 6:
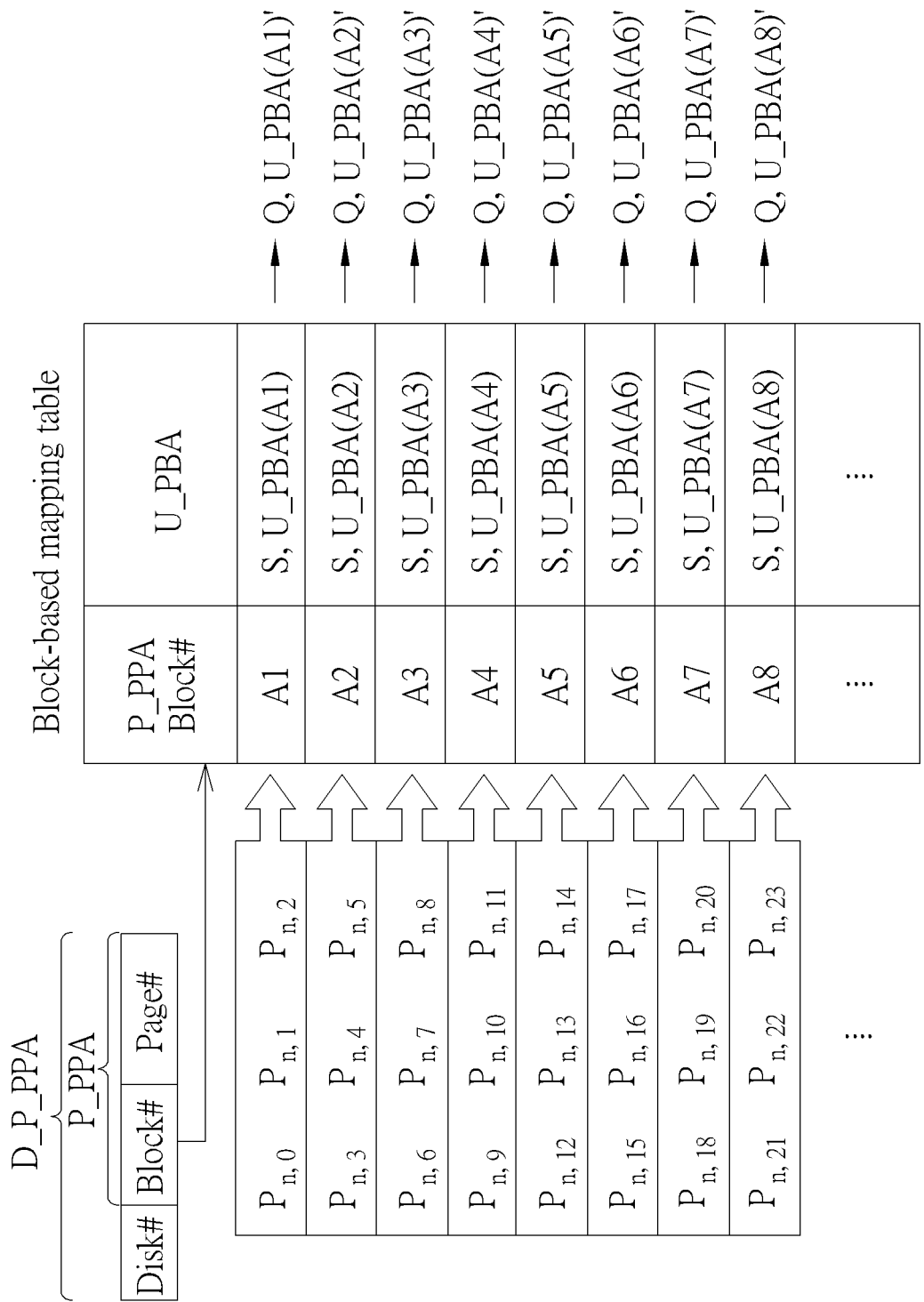
FIG. 6 illustrates some implementation details regarding internal management of the memory device shown in FIG. 3 according to an embodiment of the present invention.

FIG. 6 illustrates some implementation details regarding internal management of the memory device 300 shown in FIG. 3 according to an embodiment of the present invention. As shown around the upper left of FIG. 6, any D_P_PPA of the D_P_PPAs $\{P_{n,\,0}, P_{n,\,1}, P_{n,\,2}, \ldots\}$ (e.g. n=0, 1, etc.) may comprise a disk number (Disk #), a block number (Block #), and a page number (Page #), and the P_PPA in the D_P_PPA may comprise the block number (Block #) and the page number (Page #). For example, the D_P_PPA may comprise a plurality of bits, where the disk number (Disk #), the block number (Block #), and the page number (Page #) may comprise the most significant bit (MSB), the secondary or higher bits, and the remaining or the lower bits, respectively, but the present invention is not limited thereto. According to this embodiment, regarding each channel (e.g. the channel Ch(m)), the memory controller 310 may obtain P_PPA block numbers (P_PPA Block #) (e.g. the block numbers (Block #) within the P_PPAs of the D_P_PPAs $\{P_{n,\,0}\ P_{n,\,1}, P_{n,\,2}, \ldots\}$) from the D_P_PPA $\{P_{n,\,0}\ P_{n,\,1}, P_{n,\,2}, \ldots\}$, and may record the relationships between the P_PPA block numbers (P_PPABlock #) and Usable Physical Block Addresses (U_PBAs) into a block-based mapping table such as that shown in FIG. 6, and more particularly, and may also record the associated block type of each of the blocks whose P_PPA block numbers are recorded. For example, the memory controller 310 may obtain the P_PPA block numbers {A1, A2, A3, A4, A5, A6, A7, A8, . . . } from the associated D_P_PPA such as that shown around the left-hand side of the corresponding row of table contents of the block-based mapping table, and may record the P_PPA block numbers {A1, A2, A3, A4, A5, A6, A7, A8, . . . }, the block type (e.g. "S" which may stand for SLC block), and the U_PBAs {U_PBA(A1), U_PBA(A2), U_PBA(A3), U_PBA(A4), U_PBA(A5), U_PBA(A6), U_PBA(A7), U_PBA (A8), . . . }, to indicate the relationships between the P_PPA block numbers (P_PPA Block #) and U_PBAs. The memory controller 310 may collect information from SLC blocks into QLC blocks for better accessing performance. For example, certain data D sent from the processing circuit 110 shall be stored into the memory devices. The data D shall be stored into the SLC blocks of a memory first, and then the memory controller 310 may copy the data D in the SLC blocks into a QLC block later. The memory controller 310 may update the block-based mapping table, and more particularly, may record the block type (e.g. "Q" which may stand for QLC block), and the U_PBAs {U_PBA(A1)', U_PBA(A2)', U_PBA(A3)', U_PBA(A4)', U_PBA(A5)', U_PBA(A6)', U_PBA(A7)', U_PBA(A8)', . . . }, to indicate the latest relationships between the P_PPA block numbers (P_PPA Block #) and U_PBAs.

Figure 7:
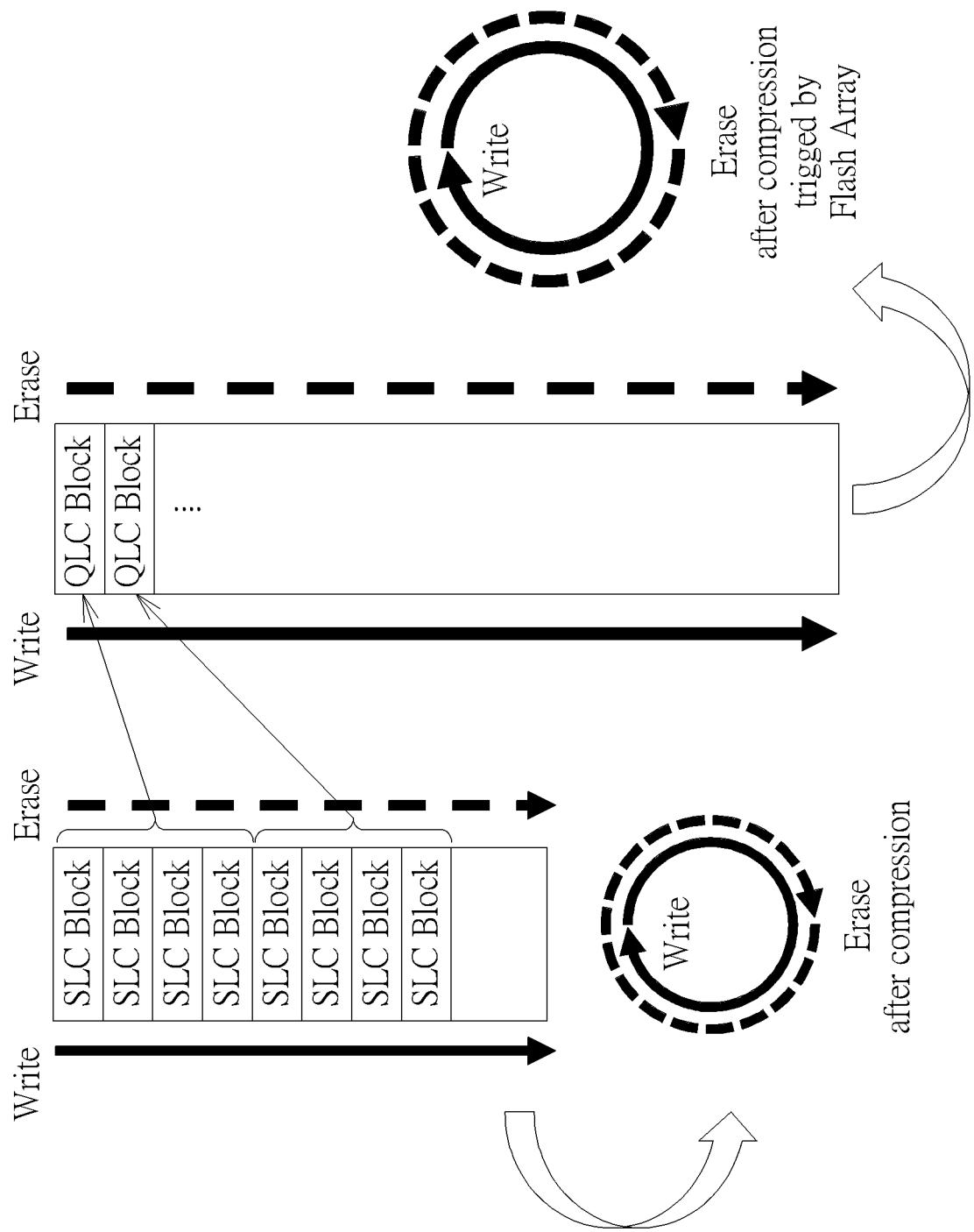
FIG. 7 illustrates some sequential operations within the memory device shown in FIG. 3 according to an embodiment of the present invention.

FIG. 7 illustrates some sequential accessing operations (e.g. write operations and erase operations) within the memory device 300 shown in FIG. 3 according to an embodiment of the present invention. Regarding each channel (e.g. the channel Ch(m)), the memory controller 310 may sequentially write the pages (e.g. the data and parity pages) into SLC blocks, and may sequentially perform compression by collecting information from the SLC blocks into QLC blocks, and more particularly, may sequentially erase the SLC blocks after the compression (collecting), where write operations (e.g. writing into the SLC blocks) and erase operations (e.g. erasing the SLC blocks) can be performed sequentially in respective cycles. In addition, the memory controller 310 may sequentially write the information collected from the SLC blocks into the QLC blocks, and may sequentially perform compression trigged by the memory controller 310 on the QLC blocks, and more particularly, may sequentially erase the QLC blocks after the compression trigged by the memory controller 310, where write operations (e.g. writing into the QLC blocks) and erase operations (e.g. erasing the QLC blocks) can be performed sequentially in respective cycles. As there are multiple threads that respectively assigned to dedicate channels of the disks, access operations corresponding to the threads typically make the data uniformly written into the set of NV memory elements corresponding to the channel Ch(m), sequential control is indeed workable based on the present invention method and apparatus.

Figure 8:
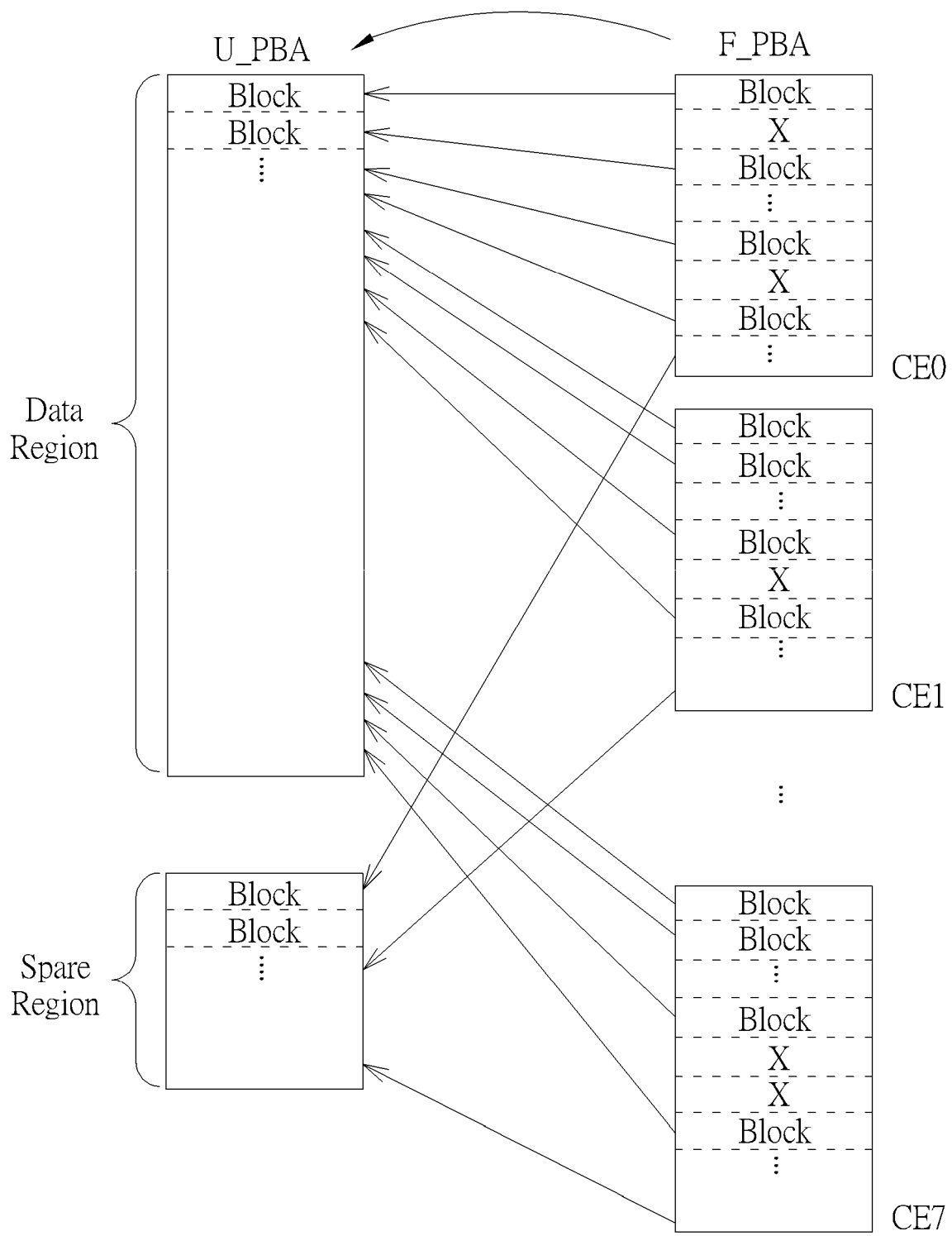
FIG. 8 illustrates some mapping relationships between Usable Physical Block Addresses (U_PBAs) and Flash Physical Block Addresses (F_PBAs) according to an embodiment of the present invention.

FIG. 8 illustrates some mapping relationships between U_PBAs and Flash Physical Block Addresses (F_PBAs) according to an embodiment of the present invention. As there may be some bad blocks (labeled "X" for better comprehension), the memory controller 310 may record the mapping relationships between the U_PBAs and F_PBAs, and use the usable blocks according to the U_PBAs. In addition, the memory controller 310 may arrange the usable blocks into a data region and a spare region. For example, the memory controller 310 may utilize the blocks in the data region to store user data, and may utilize the blocks in the spare region to perform internal management, but the present invention is not limited thereto.

According to some embodiments, regarding a first thread (e.g. one of the threads {Th(0), . . . , Th(7)}), when the upper layer ask for writing first information at a S_LBA, the Flash Array Control 111 may translate the S_LBA into a D_P_PPA and send a host write command and the D_P_PPA to the disk layer (e.g. the memory devices Disk(0), Disk(1), Disk(2), Disk(3), and Disk(4)). Taking the memory device 300 as an example of the memory device Disk(n) within the memory devices Disk(0), Disk(1), . . . , and Disk(N−1) (e.g. N=5), the memory controller 310 may obtain a P_PPA from the D_P_PPA and send an operation command such as a write command to the NV memory 320, to write the first information at the P_PPA in a channel corresponding to the first thread within the NV memory 320. For example, the memory controller 310 may translate the D_P_PPA into a U_PBA and translate the U_PBA into a F_PBA to write the first information into the corresponding page(s) at the F_PBA, but the present invention is not limited thereto.

In addition, regarding a second thread (e.g. another of the threads {Th(0), ..., Th(7)}), when the upper layer ask for writing second information at a S_LBA, the Flash Array Control 111 may translate the S_LBA into a D_P_PPA and send a host write command and the D_P_PPA to the disk layer (e.g. the memory devices Disk(0), Disk(1), Disk(2), Disk(3), and Disk(4)). Taking the memory device 300 as an example of the memory device Disk(n) within the memory devices Disk(0), Disk(1), ..., and Disk(N−1) (e.g. N=5), the memory controller 310 may obtain a P_PPA from the D_P_PPA and send an operation command such as a write command to the NV memory 320, to write the second information at the P_PPA in a channel corresponding to the second thread within the NV memory 320. For example, the memory controller 310 may translate the D_P_PPA into a U_PBA and translate the U_PBA into a F_PBA to write the second information into the corresponding page(s) at the F_PBA, but the present invention is not limited thereto.

According to some embodiments, when the upper layer ask for reading information (e.g. the first information, the second information, etc.) at a S_LBA, the Flash Array Control 111 and the memory controller 310 may perform address translation operations in a similar way, respectively. For brevity, similar descriptions for these embodiments are not repeated in detail here.

Figure 9:
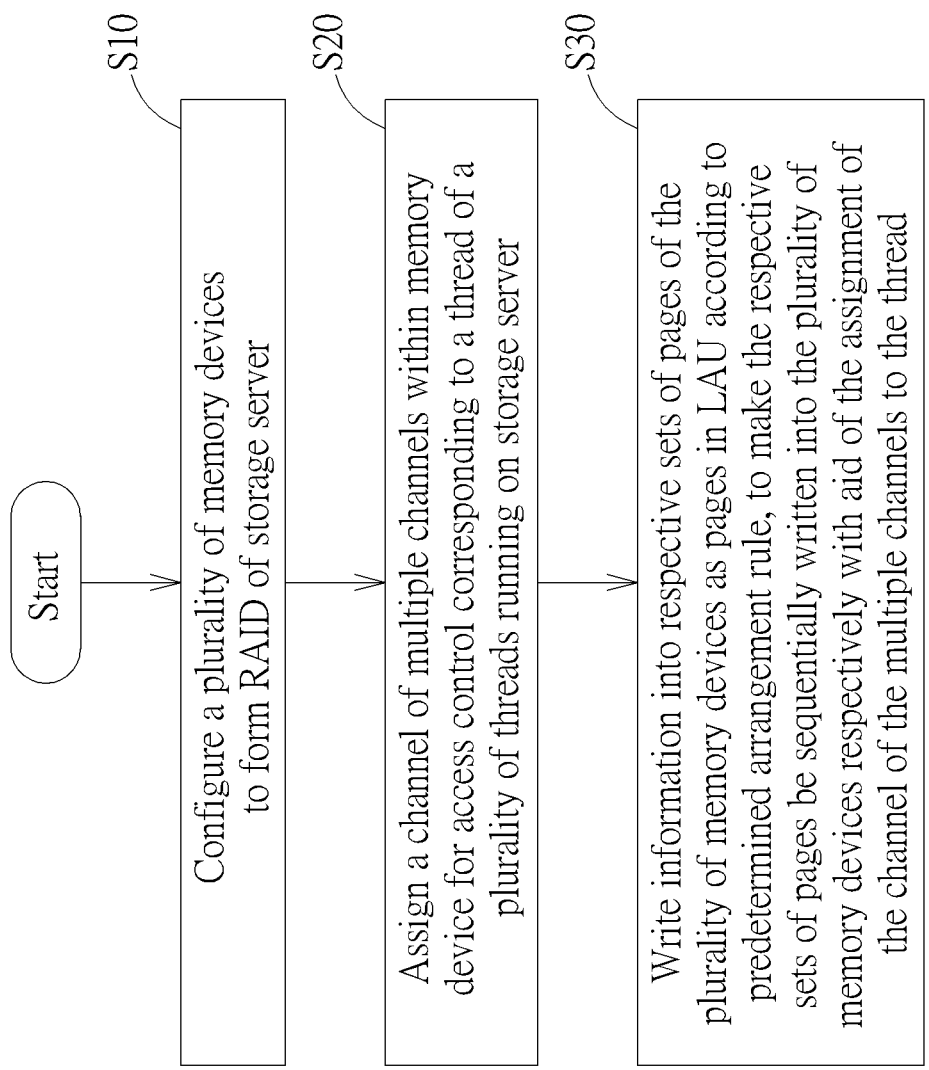
FIG. 9 is a working flow of a method for performing storage control in a storage server according to an embodiment of the present invention.

FIG. 9 is a working flow of the method for performing storage control in the storage server according to an embodiment of the present invention. The method can be applied to the storage server 100 comprising the processing circuit 110 running the program modules 110P corresponding to the method, where the memory devices Disk(0), Disk(1), ..., and Disk(N−1) (e.g. SSDs) may be installed in the storage server 100 to form the RAID such as an All Flash Array (AFA), and the processing circuit 110 running the program modules 110P corresponding to the method may control the operations of the storage server 100 according to the method. For example, each memory device of the memory devices Disk(0), Disk(1), ..., and Disk(N−1), such as the memory device Disk(n) mentioned above, may comprise a memory controller for controlling operations of the memory device and a NV memory (e.g. a Flash memory) for storing data, such as the memory controller 310 and the NV memory 320 shown in FIG. 3.

In Step S10, the storage server 100 (e.g. the processing circuit 110) may configure a plurality of memory devices installed at the storage server 100, such as the memory devices Disk(0), Disk(1), ..., and Disk(N−1), to form the RAID of storage server 100.

In Step S20, regarding the memory device Disk(n) such as the memory device 300, the memory controller 310 may assign a channel of multiple channels within the memory device, such as the channel Ch(m) of the channels {Ch(0), ..., Ch(M−1)}, for access control corresponding to a thread of a plurality of threads running on the storage server 100, such as the thread Th(m). Taking the memory device 300 as an example of the memory device Disk(n), the NV memory 320 in the memory device 300 may comprise the plurality of sets of NV memory elements respectively corresponding to the channels {Ch(0), ..., Ch(M−1)}, where each set of the plurality of sets of NV memory elements is dedicated to one of the channels {Ch(0), ..., Ch(M−1)}.

In Step S30, during storing the series of LAUs {LAU(0), LAU(1), ...} into the RAID, the storage server 100 (e.g. the processing circuit 110) may write information into respective sets of pages of the plurality of memory devices as the pages in a LAU of the series of LAUs {LAU (0), LAU (1), ...} according to a predetermined arrangement rule such as that of the arrangement shown in FIG. 4, to make the respective sets of pages be sequentially written into the plurality of memory devices respectively with aid of the assignment of the channel of the multiple channels to the thread. For example, the respective sets of pages may represent the respective columns of pages in the LAU, respectively, such as the five columns of pages in one of the LAUs (e.g. LAU(0), LAU(1), etc.) in FIG. 4. According to the predetermined arrangement rule, the processing circuit 110 may write the information to the respective columns of pages in the LAU in turn (e.g. from the memory device Disk(0) to the memory device Disk(4) repeatedly as shown in FIG. 4). Taking the LAU LAU(0) as an example of the LAU mentioned in Step S30, the information may comprise multiple pages of data (e.g. D1, D2, D3, D4, D5, D6, etc.) and associated pages of parity-codes (e.g. P1, Q1, P2, Q2, etc.), and the respective columns of pages in the LAU may comprise a first set of columns and a second set of columns (e.g. the set of three columns at the left-hand side and the set of two columns at the right-hand side within the five columns of pages in this LAU) for storing the multiple pages of data and associated pages of parity-codes, respectively.

According to this embodiment, during writing a plurality of pages of the series of LAUs {LAU(0), LAU(1), ...} into the RAID, the processing circuit 110 (e.g. the Flash Array Control 111 running thereon) may record the relationships between the S_LBAs and the D_P_PPAs for the plurality of pages, respectively, for performing access control of the series of LAUs {LAU(0), LAU(1), ...}, and may assigning the D_P_PPAs (e.g. $\{P_{0,\,0},\,P_{1,\,0},\,P_{2,\,0},\,P_{3,\,0},\,P_{4,\,0}\}$, $\{P_{0,\,1},\,P_{1,\,1},\,P_{2,\,1},\,P_{3,\,1},\,P_{4,\,1}\}$, etc.) to the corresponding memory devices within the plurality of memory devices, for accessing the pages at the D_P_PPAs within the RAID, and more particularly, may record the relationships between the S_LBAs of the pages {{D1, D2, D3, P1, Q1}, {D4, D5, D6, P2, Q2}, ...} and the D_P_PPAs {{$P_{0,\,0},\,P_{1,\,0},\,P_{2,\,0},\,P_{3,\,0},\,P_{4,\,0}$}, {$P_{0,\,1},\,P_{1,\,1},\,P_{2,\,1},\,P_{3,\,1},\,P_{4,\,1}$}, ...} in the aforementioned at least one S_LBA-to-D_P_PPA table, where multiple subsets of the aforementioned at least one S_LBA-to-D_P_PPA table may be arranged to maintain access control respectively corresponding to the plurality of memory devices. Regarding the memory device Disk(n) such as the memory device 300, the memory controller 310 may perform some internal management operations of the memory device 300, such as: parsing a P_PPA in a D_P_PPA of the D_P_PPAs, such as that in any of the D_P_PPAs $\{P_{n,\,0}\,P_{n,\,1}\,P_{n,\,2},\,...\}$ (e.g. n=0, 1, etc.) as shown in FIG. 6, to obtain a block number (Block #) from the P_PPA; and during accessing in response to the D_P_PPA, updating the block-based mapping table in the memory device 300 according to the block number (Block #) as shown in FIG. 6, for performing access control corresponding to the D_P_PPA. Thus, in response to the D_P_PPA, the memory device 300 (e.g. the memory controller 310) can accesses a page corresponding to the D_P_PPA without referring to a page-based mapping table.

In addition, the memory device 300 (e.g. the memory controller 310) may perform access operations (e.g. reading or writing) on the plurality of sets of NV memory elements through the multiple channels such as the channels {Ch(0), ..., Ch(M−1)}, respectively. As the memory device 300 (e.g. the memory controller 310) assigns the channel for access control corresponding to the thread, and as the storage server 100 (e.g. the processing circuit 110) writes the information according to the predetermined arrangement rule such as that of the arrangement shown in FIG. 4, the respective sets of pages can be sequentially written into the plurality of memory devices respectively with the aid of the assignment of the channel of the multiple channels to the thread. Regarding each channel of the multiple channels, such as the channel Ch(m), the memory device 300 (e.g. the memory controller 310) may sequentially write certain information pages (e.g. data pages or parity pages) into SLC blocks such as that shown in FIG. 7, sequentially perform compression by collecting information from the SLC blocks into QLC blocks such as that shown in FIG. 7, and sequentially erase the SLC blocks after the compression (e.g. this collecting operation), and more particularly, may sequentially write the information collected from the SLC blocks into the QLC blocks, sequentially perform compression on the QLC blocks, and sequentially erase the QLC blocks. As a result, writing into the SLC blocks and erasing the SLC blocks can be performed sequentially in respective cycles as illustrated with the circles in the left half of FIG. 7, and writing into the QLC blocks and erasing the QLC blocks can be performed sequentially in respective cycles as illustrated with the circles in the right half of FIG. 7. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing storage control in a storage server, the method being applied to the storage server, the method comprising:
   regarding any memory device of a plurality of memory devices installed at the storage server, assigning a channel of multiple channels within the memory device for access control corresponding to a thread of a plurality of threads running on the storage server, wherein the storage server configures the plurality of memory devices to form a Redundant Array of Independent Disks (RAID) of the storage server; and
   during storing a series of logical access units (LAUs) into the RAID, writing information into respective sets of pages of the plurality of memory devices as pages in a LAU of the series of LAUs according to a predetermined arrangement rule, to make the respective sets of pages be sequentially written into the plurality of memory devices respectively with aid of the assignment of the channel of the multiple channels to the thread.

2. The method of claim 1, wherein the memory device comprises a non-volatile (NV) memory, and the NV memory comprises a plurality of sets of NV memory elements respectively corresponding to the multiple channels.

3. The method of claim 2, wherein each set of the plurality of sets of NV memory elements is dedicated to one of the multiple channels.

4. The method of claim 1, wherein the respective sets of pages represent respective columns of pages in the LAU, respectively; and writing the information into the respective sets of pages of the plurality of memory devices as the pages in the LAU of the series of LAUs according to the predetermined arrangement rule comprises:
   according to the predetermined arrangement rule, writing the information to the respective columns of pages in the LAU in turn.

5. The method of claim 4, wherein the information comprises multiple pages of data and associated pages of parity-codes, and the respective columns of pages in the LAU comprise a first set of columns and a second set of columns for storing the multiple pages of data and associated pages of parity-codes, respectively.

6. The method of claim 1, further comprising:
   during writing a plurality of pages of the series of LAUs into the RAID, recording relationships between System Logic Block Addresses (S_LBAs) and Disk Pseudo Physical Page Addresses (D_P_PPAs) for the plurality of pages, respectively, for performing access control of the series of LAUs.

7. The method of claim 6, further comprising:
   assigning the D_P_PPAs to corresponding memory devices within the plurality of memory devices, for accessing the pages at the D_P_PPAs within the RAID.

8. The method of claim 6, further comprising:
   recording the relationships between the S_LBAs of the pages and the D_P_PPAs in at least one S_LBA-to-D_P_PPA table, wherein multiple subsets of the at least one S_LBA-to-D_P_PPA table are arranged to maintain access control respectively corresponding to the plurality of memory devices.

9. The method of claim 6, further comprising:
   performing internal management operations of the memory device,
      wherein the internal management operations comprises:
      parsing a Pseudo Physical Page Addresses (P_PPA) in a D_P_PPA of the D_P_PPAs to obtain a block number from the P_PPA; and
      during accessing in response to the D_P_PPA, updating a block-based mapping table in the memory device according to the block number, for performing access control corresponding to the D_P_PPA.

10. The method of claim 9, wherein in response to the D_P_PPA, the memory device accesses a page corresponding to the D_P_PPA without referring to a page-based mapping table.

11. The method of claim 1, further comprising:
    regarding each channel of the multiple channels, sequentially writing into Single Level Cell (SLC) blocks.

12. The method of claim 11, further comprising:
    regarding said each channel of the multiple channels, sequentially performing compression by collecting information from the SLC blocks into Quadruple Level Cell (QLC) blocks.

13. The method of claim 12, further comprising:
    regarding said each channel of the multiple channels, sequentially writing the information collected from the SLC blocks into the QLC blocks.

14. The method of claim 13, further comprising:
    regarding said each channel of the multiple channels, sequentially performing compression on the QLC blocks.

15. The method of claim 13, further comprising:
    regarding said each channel of the multiple channels, sequentially erasing the QLC blocks, wherein writing into the QLC blocks and erasing the QLC blocks are performed sequentially in respective cycles.

16. The method of claim 11, further comprising:
    regarding said each channel of the multiple channels, sequentially erasing the SLC blocks, wherein writing into the SLC blocks and erasing the SLC blocks are performed sequentially in respective cycles.

17. A memory controller of the memory device for controlling operations of the memory device according to the method of claim 1, wherein the memory device comprises the memory controller and a non-volatile (NV) memory, and the NV memory comprises a plurality of sets of NV memory elements respectively corresponding to the multiple channels, wherein:
the memory controller is arranged to perform access operations on the plurality of sets of NV memory elements through the multiple channels, respectively.

18. The memory controller of claim 17, wherein the memory controller is arranged to assign the channel of the multiple channels as a dedicated channel for the thread.

19. The memory device that operates according to the method of claim 1, wherein the memory device comprises:
a non-volatile (NV) memory, comprising:
a plurality of sets of NV memory elements respectively corresponding to the multiple channels; and
a memory controller, arranged to control operations of the memory device, wherein the memory controller performs access operations on the plurality of sets of NV memory elements through the multiple channels, respectively.

20. The storage server that operates according to the method of claim 1, wherein the storage server comprises:
an interface circuit, arranged to install the plurality of memory devices; and
a processing circuit, arranged to control operations of the storage server, wherein during storing the series of LAUs into the RAID, the processing circuit writes the information into the respective sets of pages of the plurality of memory devices as the pages in the LAU of the series of LAUs according to the predetermined arrangement rule, to make the respective sets of pages be sequentially written into the plurality of memory devices respectively with the aid of the assignment of the channel of the multiple channels to the thread.

* * * * *